United States Patent

[11] 3,623,938

| | | |
|---|---|---|
| [72] | Inventor | Kenneth Lee Jenkins<br>Somerville, N.J. |
| [21] | Appl. No. | 35,569 |
| [22] | Filed | May 7, 1970 |
| [45] | Patented | Nov. 30, 1971 |
| [73] | Assignee | Johns-Manville Corporation<br>New York, N.Y. |

[54] MINERAL AGGREGATE INSULATION BOARD
11 Claims, No Drawings

[52] U.S. Cl. .................................................. 161/159,
161/162
[51] Int. Cl. ..................................................... B32b 3/26,
B32b 19/00
[50] Field of Search ........................................... 161/159,
162

[56] References Cited
UNITED STATES PATENTS

| | | | |
|---|---|---|---|
| 2,803,575 | 8/1957 | Riddell et al. ................ | 161/162 |
| 2,806,509 | 9/1957 | Bozzacco et al. ............. | 161/162 |
| 3,515,624 | 6/1970 | Garnero ....................... | 161/162 |

*Primary Examiner*—William J. Van Balen
*Attorneys*—John A. McKinney and Robert M. Krone ABSTRACT: A strong, mineral aggregate insulation board of lowered thermal conductivity is provided by incorporating 40–80 percent by weight of ultrafine particles of expanded volcanic glass that is 60 mesh and finer particle size, and 5–30 percent by weight of mineral fiber. Short absorbent vegetable fibers are included in the board for strength. Sizing agents are also often added to impart water resistance to the board, and additional adhesive tack materials, or binders, are sometimes added to further increase board strength.

MINERAL AGGREGATE INSULATION BOARD

FIELD OF THE INVENTION

This invention relates to thermal insulating materials. More particularly, the invention relates to insulating and building boards comprising expanded volcanic glass and a fibrous material.

BACKGROUND OF THE INVENTION

Volcanic glass is a generic term for certain glasses of volcanic origin which contain relatively small amounts of water chemically bound in a glassy, noncrystalline structure. Upon rapidly heating the volcanic glass to the point of incipient fusion, it suddenly expands due to the internal pressure of the vaporized water. When the temperature and time of the heating operation is controlled, an expanded product is formed which includes a plurality of sealed bubbles which have a subatmospheric internal pressure. The expanded material has excellent thermal and sound insulating properties.

One particular from of volcanic glass, perlite, has previously been incorporated in roof insulation boards made by deposition from an aqueous slurry on wire screens, such as a Fourdrinier or cylinder machine. The desired thickness of these perlite insulation boards has previously been determined by a combination of the requirement for the board to meet a minimum overall thermal conductance value, and the strength requirements for the board.

In general, the thermal conductivity of a perlite-containing board decreases as the board density decreases, but undesirably, board strength also decreases with a decrease in density. Consequently, the minimum permissible density is limited and the board is made in a nominal thickness to achieve the thermal conductance value required. For example, it has been common to produce boards having a density range of 10.0 to 12.0 lb./cu. ft. and a thickness of slightly over 1 inch to achieve adequate board strength and the desired value of thermal conductance.

There has existed a definite need for a new insulation board formulation which will attain lower values of thermal conductivity and higher levels of product strength than previously attainable in mineral aggregate type boards of comparable densities. Such a formulation would permit a reduction in board density and/or thickness and would significantly reduce the raw materials required to produce a given area of insulation board. A thickness reduction of the board, besides decreasing raw material requirements, also tends to promote increased production speeds on the equipment used to form the board.

OBJECTS OF THE INVENTION

It is an object of this invention to provide a new and improved mineral aggregate insulation board.

Another object of this invention is to provide a new thermal insulation board that possesses significantly lower thermal conductivity and greater strength than previously attainable in mineral aggregate insulation boards of comparable densities.

Yet another object of the invention is to provide a new mineral aggregate thermal insulation board that will meet strength and thermal resistance requirements at reduced thicknesses when compared to comparable existing thermal insulation board.

Additional objects and advantages of the invention will be set forth in part in the description, or may be learned by the practice of the invention.

SUMMARY OF THE INVENTION

The invention provides a new and improved mineral aggregate insulation board comprising 40–80 percent by weight of expanded volcanic glass, the expanded glass consisting essentially of 60 mesh and finer particle sizes; 5–30 percent by weight of mineral fiber; 10–25 percent by weight of short absorbent vegetable fiber; and up to 25 percent total of sizing agent and binder for imparting water resistance and additional strength to the insulating board.

Preferably, the volcanic glass comprises perlite particles, and at least 50 percent by weight of the unexpanded perlite particles will pass a 200 mesh screen (U.S. Standard). In preferred embodiments of the invention, the mineral fiber is present in amounts of from 10 to 30 percent by weight, and the mineral fiber is selected from rock wool, glass wool, and asbestos wool.

It has been found that ultrafine volcanic glass particles, such as perlite, can be expanded, and that the expanded ultrafine particles can be totally substituted for the usual coarser, expanded perlite with unexpectedly superior results, if mineral wool is incorporated in the thermal insulation board.

Unexpectedly, a significant reduction in product thermal conductivity is obtained by incorporating ultrafine particles of mineral aggregate with varying percentages of mineral fiber. The unique reduction in thermal conductivity is accomplished only when both the ultrafine, expanded glass particles and the mineral fiber are each present in the product. Ultrafine aggregate used in formulations which do not contain mineral fiber do not cause a significant reduction in thermal conductivity when compared to identical formulations in which coarser aggregates are used.

Formulations containing mineral fiber and coarse aggregates do produce boards having somewhat lower thermal conductivity values than coarse aggregate formulations which do not contain mineral fiber. However, the thermal conductivity improvement resulting from addition of mineral fiber to a coarse aggregate formulation does not even closely approach the level of thermal conductivity improvement which results from practice of the present invention.

There evidently exists an as yet unexplained interaction between the fine aggregate and the mineral fiber, which yields the desirable thermal conductivity improvement.

DESCRIPTION OF THE PREFERRED EMBODIMENT

In the practice of the present invention, very small particles of a volcanic glass, such as perlite, of expanded size 60 mesh and finer and 5–30 percent by weight of mineral fiber are incorporated in a mineral aggregate insulation board which is formed according to conventional procedures, and also contains short absorbent vegetable fibers and a binder.

The product is made from expanded volcanic glass particles which are too fine for use as plaster and concrete aggregates. Suitable volcanic glass particles include perlite, Kansas ash (a wind deposited volcanic pumice very similar to perlite), and other volcanic glass particles which can be expanded. Deposits of these volcanic glasses are numerous in Kansas, Oklahoma, and the Texas panhandle.

The particle sizes of the Kansas ash deposits are essentially all smaller than 100 mesh, before expansion. Some deposits of Kansas ash can be expanded to produce lower expanded densities than can be obtained with perlite of similar particle sizes.

Because the particles of expanded volcanic glass which are used in the board products of this invention are extremely fine, small perlite fines which result from various manufacturing operations, and which would otherwise be waste materials, can be utilized. It has been found that fine particles of perlite can be expanded in a manner similar to that employed to expand the larger size of perlite particles.

It is desirable, to achieve the beneficial reduction in thermal conductivity which results from the present invention, that the expanded volcanic glass particles present in the insulation board not contain any mineral aggregate particles over 60 mesh in size.

Preferably, crude unexpanded perlite used in the practice of the invention, contains 0–3 percent of particles that are held on a 100 mesh screen, 12–22 percent by weight of particles held on a 200 mesh screen, 25–45 percent of particles held on a 325 mesh screen and 30–60 percent passing a 325 mesh screen on analysis using standard Perlite Institute test screening procedures (tests No. P.I. 113 and No. P.I. 115).

The mineral fiber incorporated in the new product of this invention is selected from rock wool, glass wool, and asbestos.

Generally, it is desirable that relatively short lengths of mineral fiber be used. Preferred average lengths of mineral fiber of about ⅛ to one inch permit uniform distribution of the fiber throughout the slurry used to form the boards. While a small amount of longer fiber (vegetable or mineral) can be distributed throughout the perlite, it is difficult to substitute long fiber (despite the advantages of its greater strength) entirely for the preferred short fiber.

The mineral fiber is incorporated in the boards of the present invention in amounts of from about 5–30 percent by weight Preferably, however, the mineral fiber is present in amounts of from 10–30 percent by weight since in the presence of ultrafine expanded perlite, the improvement in thermal efficiency is somewhat more than proportional to the concentration of the mineral wool. In other words, while adding as little as 5 percent by weight of mineral fiber to a formulation containing ultrafine perlite particles produces a larger decrease in thermal conductivity, than would normally be expected, even larger decreases in thermal conductivity can be obtained with higher percentages of mineral fiber.

For example, when the mineral fiber content is 10 percent, the amount of thermal efficiency improvement unexpectedly caused by the combination of the mineral wool and the perlite ultrafines might be 0.01 B.t.u. per hour per square foot °F. In the presence of 20 percent mineral wool, the amount of unexpected K factor improvement might be 0.02 K Factor units when compared to the same formulation containing the same amount of mineral wool, and larger, conventionally sized perlite particles.

A vegetable fiber such as pulped newsprint, pulped Kraft fiber or other cellulosic fiber is incorporated in the insulating board of this invention, in concentrations of 10–25 percent by weight. The vegetable fiber is used to bond the product together through the mechanism of interfibril bonding between fibers in the manner in which paper or cardboard achieves its strength. Other vegetable and synthetic organic fibers of the types used in the manufacture of paper can be utilized in the product. However, at the present time pulped newsprint and pulped Kraft offer significant cost advantages.

The product of this invention is essentially perlite and mineral fiber with only enough vegetable fiber present to form a bonding matrix or skeleton to hold the whole form together. The quantity of combustible vegetable fiber used is usually limited to 25 percent of less so the produce will not support combustion. The mineral fibers used do not possess the self-binding character of the vegetable fiber. The mineral fiber is incombustible like the perlite, and is present, in combination with the perlite, primarily to impart the improved insulating efficiency. The mineral fiber may impart some additional strength to the product if the mineral fibers possess sufficient length and have a high tensile strength, such as is provided by glass fiber, and asbestos fiber. However, the mineral fiber is primarily used to improve insulating efficiency and is not utilized in this invention for the principle purpose of providing strength.

The product, to be commercially attractive, must frequently possess a high level of water resistance. Also, the product often must possess strength properties greater than that imparted by the vegetable fiber alone. For these reasons, a sizing agent or an additional adhesive tack material or binder, or both, are often incorporated into the board for imparting additional strength to the vegetable fiber-fibril matrix bond. The inclusion or exclusion from the board of a particular sizing agent or binder is not believed to affect the thermal conductivity improvement achieved by the present invention. Some materials, such as a high melting point asphalt can be used to impart both sizing and strength (bonding) properties to the product. Despite the fact that low melting point asphalts often exhibit binder characteristics to some extent, usually two separate ingredients are utilized in combination to obtain the required levels of water resistance and binding action. The presently preferred sizing agent is asphalt emulsion, and the presently preferred binder is tapioca starch, although various other sizing agents and binders can be used depending somewhat on the uses and desired properties of the product. Bituminous emulsions, sodium and potassium silicate, aluminum phosphate, pitch, clays, various resins, natural and modified starches, and cements can be utilized. Aside from the matter of relatively high cost, synthetic resins, such as calcium acrylate, can also be used.

Also, to be commercially attractive, the product should not support combustion. This property is easily achieved, probably due to the face that the product is mainly perlite, and the combustible vegetable fiber, sizing and binder are so separated and isolated by the perlite that they cannot transmit combustion from one point to the other. Even highly combustible sizing and binder materials such as asphalt emulsion and starch can be tolerated in the product at levels sufficient to achieve their purpose without causing the product to be combustible.

In general, the ingredients of which the board is comprised should be present in amounts by weight in accordance with the following approximate percentage ranges: 40–80 percent expanded fine perlite particles; 5–30 percent mineral fiber; 10–25 percent vegetable fiber; and 0–25 percent in the aggregate of binder and sizing agent. For commercially attractive products the total quantity of binder and sizing agent preferably is 5–25 percent by weight.

For a clearer understanding of the invention, specific examples of it are set forth below. These examples are illustrative, and are not to be understood as limiting the scope and underlying principles of the invention in any way. All percentages listed in the specification and claims are weight percentages unless otherwise noted. All screen sizes are U.S. Standard unless otherwise noted.

EXAMPLE 1

Thermal insulating boards are formed on a Fourdrinier machine from various aqueous slurries having solids concentrations of about 6 percent by weight. During and after forming, the board is lightly compressed to consolidate it and to impart a uniform thickness of 1.0 in. The boards are then dried to a moisture content of about 2 percent.

TABLE I

| Ingredient | Example | | | | | | | |
|---|---|---|---|---|---|---|---|---|
|  | 1 | 2 | 3 | 4 | 5 | 6 | 7 | 8 |
| Standard aggregate | 70 | 0 | 62.5 | 0 | 58 | 0 | 52 | 0 |
| Ultrafine aggregate | 0 | 70 | 0 | 62.5 | 0 | 58 | 0 | 52 |
| Rock wool | 0 | 0 | 10.4 | 10.4 | 20 | 20 | 25 | 25 |
| Pulped news | 22 | 22 | 18.34 | 18.34 | 13.8 | 13.8 | 15 | 15 |
| Asphalt emulsion | 5 | 5 | 6.24 | 6.24 | 5.5 | 5.5 | 5 | 5 |
| Tapioca starch | 3 | 3 | 2.5 | 2.5 | 2.7 | 2.7 | 3 | 3 |

The aggregates designated in table I as "Ultrafine" and "Standard" comprise expanded perlite having the size distributions shown in table II below.

TABLE II.—AGGREGATES USED IN FORMULATIONS

| Screened fraction (U.S. std. sieve) | Percent by weight | |
|---|---|---|
|  | Expanded standard | Expanded ultrafine |
| +20 | 10 | 0 |
| 20 to 60 | 60 | 0 |
| 60 to 100 | 10 | 25 |
| 100 to 200 | 10 | 25 |
| −200 | 10 | 50 |
| Loose density (lb./ft.³) | 4.5 | 5.0 |

The thermal conductivity of each of the eight board formulations is then measured. The measured thermal conductivities are shown in table III.

TABLE III

| Example No. | Percent rock wool | Type of sample aggregate | Thermal conductivities at 10.80 lb./ft.³ density |
|---|---|---|---|
| 1 | 0 | Standard | [1] 0.385 |
| 2 | 0 | Ultrafine | [1] 0.384 |
| 3 | 10 | Standard | [1] 0.367 |
| 4 | 10 | Ultrafine | [1] 0.357 |
| 5 | 20 | Standard | [1] 0.369 |
| 6 | 20 | Ultrafine | [1] 0.348 |
| 7 | 25 | Standard | [1] 0.359 |
| 8 | 25 | Ultrafine | [1] 0.339 |

[1] B.t.u. in./hr./sq. ft.°F.

As shown in Table III, boards formulated to contain both mineral fiber and ultrafine perlite possess significantly lower thermal conductivities when compared to boards that contain larger perlite particles and comparable amounts of mineral fiber.

Examples 1 and 2 show that the mere substitution of fine perlite particles for coarser particles, in the absence of the mineral fibers, does not result in a significantly lower thermal conductivity.

EXAMPLES 9-13

The procedure of examples 1-8 is followed to produce boards containing 58 percent of various proportions of the standard and ultrafine perlite aggregates described in table II; 20 percent rock wool; 13.8 percent pulped newsprint; 5.5 percent asphalt emulsion, and 2.7 percent tapioca starch.

The resulting boards are tested for thermal conductivity with the results tabulated in table IV below.

TABLE IV.—THERMAL CONDUCTIVITIES OBTAINED FROM VARIOUS MIXTURES OF PERLITE AGGREGATE IN 20% ROCK WOOL FORMULATIONS

| Example No. | Aggregate mixture | | Thermal conductivity at 10.80 lb./ft.³ density |
|---|---|---|---|
| | Standard, percent | Ultrafine, percent | |
| 9 | 100 | 0 | [1] 0.369 |
| 10 | 75 | 25 | [1] 0.366 |
| 11 | 50 | 50 | [1] 0.365 |
| 12 | 25 | 75 | [1] 0.361 |
| 13 | 0 | 100 | [1] 0.348 |

[1] B.t.u. in./hr./sq. ft. ° F.

These examples show that the most significant drop in thermal conductivity occurs in example 13, the formulation that contains only ultrafine aggregate. The fact that the largest conductivity drop occurs when the coarse perlite aggregate is completely eliminated from the formulation suggests the desirability of completely eliminating aggregate particles larger than 60 mesh from the formulation.

I CLAIM:

1. A mineral aggregate insulation board comprising:
   a. 40-80 percent by weight of an expanded volcanic glass, substantially all of the particles of which are able to pass through a 60 mesh U.S. Standard screen;
   b. 5-30 percent by weight of mineral fiber;
   c. 10-25 percent by weight of short, absorbent vegetable fiber; and
   d. from 0-25 percent by weight in the aggregate of a binder and a sizing agent.

2. The insulation board of claim 1 in which at least about 50 percent by weight of said volcanic glass particles pass a 200 mesh U.S. Standard screen before their expansion.

3. The insulation board of claim 1 in which the mineral fiber is selected from rock wool, glass wool, and asbestos fibers.

4. The insulation board of claim 3 in which the mineral fiber is present in amounts of from 10 to about 30 percent by weight.

5. The insulation board of claim 1 wherein the aggregate of binder and sizing agent comprises 5-25 percent by weight of starch binder and asphalt sizing agent.

6. A mineral aggregate insulation board comprising:
   a. 50-70 percent by weight of an expanded volcanic glass, said expanded glass consisting essentially of 60 mesh, U.S. Standard screen size, and finer particles;
   b. 10-30 percent by weight of mineral fibers;
   c. 10-25 percent by weight of short, absorbent vegetable fiber;
   d. 5-10 percent by weight in the aggregate of a binder for imparting water resistance.

7. The insulation board of claim 6 in which the expanded volcanic glass is perlite.

8. The insulation board of claim 7 in which about 75 percent of the perlite particles prior to expansion are finer than a 100 mesh screen and about 50 percent of the perlite particles prior to expansion are finer than a 200 mesh screen.

9. The insulation board of claim 7 in which the mineral fiber is selected from rock wool, glass wool, and asbestos wool.

10. The insulation board of claim 7 in which the mineral fibers are from one-eighth to one inch long.

11. The insulation board of claim 7 in which the perlite particles before expansion consist of, by weight percent, 0-3 percent of particles that are held on a 100 mesh screen; 12-22 percent of particles that are held on a 200 mesh screen; 25-45 percent of particles that are held on a 325 mesh screen; and 30-60 percent that pass a 325 mesh screen, all screen sizes referring to U.S. Standard screen size.

* * * * *

PO-1050
(5/69)

UNITED STATES PATENT OFFICE
CERTIFICATE OF CORRECTION

Patent No. 3,623,938　　　　　　　Dated November 30, 1971

Inventor(s) Kenneth Lee Jenkins

It is certified that error appears in the above-identified patent and that said Letters Patent are hereby corrected as shown below:

Column 6, after line 35, claim 6, part "d", insert --imparting strength to the board and a sizing agent for--

Signed and sealed this 15th day of May 1973.

(SEAL)
Attest:

EDWARD M. FLETCHER, JR.　　　　　ROBERT GOTTSCHALK
Attesting Officer　　　　　　　　Commissioner of Patents